United States Patent
Kim et al.

(10) Patent No.: US 10,644,290 B2
(45) Date of Patent: May 5, 2020

(54) SEPARATOR INCLUDING LASER-INDUCED CARBONIZED GRAPHENE LAYER AND LITHIUM-SULFUR BATTERY INCLUDING THE SAME

(71) Applicant: LG Chem, Ltd., Seoul (KR)

(72) Inventors: Taek-Gyoung Kim, Daejeon (KR); Kwon-Nam Sohn, Daejeon (KR); Eun-Kyu Her, Daejeon (KR); Bu-Gon Shin, Daejeon (KR); Doo-Kyung Yang, Daejeon (KR)

(73) Assignee: LG Chem, Ltd. (KR)

( * ) Notice: Subject to any disclaimer, the term of this patent is extended or adjusted under 35 U.S.C. 154(b) by 4 days.

(21) Appl. No.: 16/089,848

(22) PCT Filed: Nov. 28, 2017

(86) PCT No.: PCT/KR2017/013719
§ 371 (c)(1),
(2) Date: Sep. 28, 2018

(87) PCT Pub. No.: WO2018/101711
PCT Pub. Date: Jun. 7, 2018

(65) Prior Publication Data
US 2019/0115580 A1    Apr. 18, 2019

(30) Foreign Application Priority Data
Nov. 29, 2016    (KR) .................. 10-2016-0160634

(51) Int. Cl.
*H01M 2/16*    (2006.01)
*H01M 2/14*    (2006.01)
(Continued)

(52) U.S. Cl.
CPC ......... *H01M 2/1686* (2013.01); *H01M 2/145* (2013.01); *H01M 2/162* (2013.01);
(Continued)

(58) Field of Classification Search
CPC ... H01M 2/1666; H01M 2/1686; H01M 2/145
See application file for complete search history.

(56) References Cited

U.S. PATENT DOCUMENTS

| | | | |
|---|---|---|---|
| 9,017,878 B2 * | 4/2015 | Kim .................. | H01M 4/13 429/251 |
| 2012/0214375 A1 * | 8/2012 | Kitano ............... | D01D 5/0038 442/336 |

(Continued)

FOREIGN PATENT DOCUMENTS

| | | |
|---|---|---|
| CN | 103490027 A | 1/2014 |
| CN | 104300128 A | 1/2015 |

(Continued)

OTHER PUBLICATIONS

Extended European Search Report for Application No. EP17876296 dated Mar. 18, 2019.
(Continued)

*Primary Examiner* — Matthew J Merkling
(74) *Attorney, Agent, or Firm* — Lerder, David, Littenberg, Krumholz & Mentlik, LLP

(57) ABSTRACT

Disclosed is a separator for an electrochemical device. The separator includes a non-woven web substrate, wherein at least one surface of the non-woven web substrate includes an electrode reactive layer formed by carbonization of the non-woven web substrate from the surface of the non-woven web substrate to a predetermined depth, and the electrode reactive layer is disposed at the outermost side of at least one surface of both surfaces of the separator.

13 Claims, 7 Drawing Sheets

(51) Int. Cl.
*H01M 10/052* (2010.01)
*H01M 4/38* (2006.01)

(52) U.S. Cl.
CPC ....... *H01M 2/1646* (2013.01); *H01M 2/1653* (2013.01); *H01M 2/1666* (2013.01); *H01M 2/1673* (2013.01); *H01M 4/38* (2013.01); *H01M 4/382* (2013.01); *H01M 10/052* (2013.01)

(56) References Cited

U.S. PATENT DOCUMENTS

| | | | |
|---|---|---|---|
| 2014/0141312 A1 | 5/2014 | Kim | |
| 2014/0217992 A1* | 8/2014 | Li | H01M 2/1646 320/148 |
| 2015/0017863 A1 | 1/2015 | Kitano et al. | |
| 2015/0024121 A1* | 1/2015 | He | H01M 10/0566 427/121 |
| 2015/0125737 A1 | 5/2015 | Arora et al. | |
| 2015/0188109 A1 | 7/2015 | Kim et al. | |
| 2016/0036037 A1 | 2/2016 | Rhodes et al. | |
| 2016/0322646 A1 | 11/2016 | Kajiwara et al. | |
| 2016/0344010 A1* | 11/2016 | Zhamu | H01M 2/1686 |
| 2017/0214019 A1* | 7/2017 | Yokoyama | H01M 10/26 |
| 2018/0151870 A1 | 5/2018 | Bolloli et al. | |
| 2019/0348657 A1* | 11/2019 | Frischmann | H01M 2/1613 |

FOREIGN PATENT DOCUMENTS

| | | |
|---|---|---|
| CN | 105261721 A | 1/2016 |
| CN | 105742567 A | 7/2016 |
| EP | 3327832 A1 | 5/2018 |
| JP | S46038619 | 11/1971 |
| JP | S56145661 A | 11/1981 |
| JP | S63148538 A | 6/1988 |
| JP | 2003272590 A | 9/2003 |
| JP | 2006176932 A | 7/2006 |
| JP | 2006188770 A | 7/2006 |
| KR | 20120091178 A | 8/2012 |
| KR | 20140064599 A | 5/2014 |
| KR | 20150078434 A | 7/2015 |
| KR | 20160087511 A | 7/2016 |
| WO | 2015098530 A1 | 7/2015 |

OTHER PUBLICATIONS

International Search Report for Application No. PCT/KR2017/013719 dated Mar. 30, 2018.

Sheng-Heng Chung et al., "A Natural Carbonized Leaf as Polysulfide Diffusion Inhibitor for High-Performance Lithium-Sulfur Battery Cells", ChemSusChem Full Papers, Published online Apr. 2, 2014, vol. 7, pp. 1655-1661.

Sheng-Heng Chung et al., "High-Performance Li—S Batteries with an Ultra-lightweight MWCNT-Coated Separator", The Journal of Physical Chemistry Letters, May 21, 2014, vol. 5, pp. 1978-1983.

* cited by examiner

SEPARATOR INCLUDING LASER-INDUCED CARBONIZED GRAPHENE LAYER AND LITHIUM-SULFUR BATTERY INCLUDING THE SAME

CROSS-REFERENCE TO RELATED APPLICATIONS

The present application is a national phase entry under 35 U.S.C. § 371 of International Application No. PCT/KR2017/013719, filed on Nov. 28, 2017, which claims priority to Korean Patent Application No. 10-2016-0160634, filed on Nov. 29, 2016, the disclosures of which are incorporated herein by reference.

TECHNICAL FIELD

The present disclosure relates to a separator for an electrochemical device and a lithium-sulfur battery including the separator.

BACKGROUND ART

A lithium-sulfur battery has high theoretical capacity and higher energy density than that of a lithium ion battery, and thus has been studied as a next-generation battery. However, a lithium-sulfur battery may undergo degradation of reactivity in an electrode as the concentration of polysulfide generated upon discharge is increased, and the electrolyte in the battery is consumed by the side reaction with an electrode, resulting in degradation of the life of a battery. To overcome this, a porous electrolyte-holding layer may be inserted to an electrode or separator to reduce the consumption of an electrolyte, to reduce resistance and to improve the reactivity in an electrode. However, it is required to maximize the above-mentioned effects in order to increase energy density.

DISCLOSURE

Technical Problem

The present disclosure is directed to providing a separator having an effect of improving reactivity in an electrode and a lithium-sulfur battery including the separator. The present disclosure is also directed to providing a method for preparing the separator. It will be easily understood that these and other objects and advantages of the present disclosure may be realized by the means shown in the appended claims and combinations thereof.

Technical Solution

In one aspect of the present disclosure, there is provided a separator for an electrochemical device to solve the above-mentioned problems. According to an embodiment of the present disclosure, there is provided a separator for an electrochemical device which includes an electrolyte-holding layer including: a non-woven web layer; and an electrode reactive layer disposed on one surface of the non-woven web layer, wherein the electrode reactive layer includes a carbide of organic polymer material, has a porous structure and is disposed at the outermost side of at least one surface of both surfaces of the separator.

According to a second embodiment, there is provided the separator for an electrochemical device of the first embodiment, which further includes a porous substrate having a porous structure, wherein the electrolyte-holding layer is disposed on at least one surface of the porous polymer substrate, the porous substrate and the non-woven web layer are stacked so that they are in surface contact with each other, and thus the electrode reactive layer is disposed on the outermost surface of the separator.

According to a third embodiment, there is provided the separator for an electrochemical device of the first or the second embodiment, wherein the organic polymer material is a non-woven web substrate, the electrolyte-holding layer includes the electrode reactive layer formed integrally with the non-woven web layer by the carbonization of the surface portion of the non-woven web substrate through pyrolysis, and the surface portion is a portion having a thickness ranging from the surface of the non-woven web substrate to a predetermined depth.

According to a fourth embodiment, there is provided the separator for an electrochemical device of any one of the first to the third embodiments, wherein the organic polymer material is a non-woven web substrate, the electrode reactive layer includes graphitic carbon as a product generated by carbonization through the pyrolysis of the non-woven web substrate, and the non-woven web includes a highly heat resistant plastic engineering polymer resin.

According to a fifth embodiment, there is provided the separator for an electrochemical device of the fourth embodiment, wherein the highly heat resistant plastic engineering polymer resin is at least one selected from the group consisting of polysulfone polymer resin (PSF), polyethersulfone polymer resin (PES), polyetherimide polymer resin (PEI), polyphenylenesulfide polymer resin (PPS), polyetheretherketone polymer resin (PEEK), polyarylate polymer resin (PA), polyamideimide polymer resin (PAI), polyimide polymer resin (PI) and polyamide polymer resin.

According to a sixth embodiment, there is provided the separator for an electrochemical device of any one of the first to the fifth embodiments, wherein the electrode reactive layer has a thickness of 100 nm-5 µm.

According to a seventh embodiment, there is provided the separator for an electrochemical device of the third embodiment, wherein the non-woven web substrate includes a highly heat resistant plastic engineering polymer resin.

According to an eighth embodiment, there is provided the separator for an electrochemical device of the seventh embodiment, wherein the highly heat resistant plastic engineering polymer resin is at least one selected from the group consisting of polysulfone polymer resin (PSF), polyethersulfone polymer resin (PES), polyetherimide polymer resin (PEI), polyphenylenesulfide polymer resin (PPS), polyetheretherketone polymer resin (PEEK), polyarylate polymer resin (PA), polyamideimide polymer resin (PAI), polyimide polymer resin (PI) and polyamide polymer resin.

According to a ninth embodiment, there is provided the separator for an electrochemical device of the second embodiment, wherein the porous substrate layer includes a polyolefin polymer resin.

According to a tenth embodiment, there is provided the separator for an electrochemical device of any one of the first to the ninth embodiments, wherein the electrolyte-holding layer has a porosity of 40-70%.

In another aspect of the present disclosure, there is also provided an electrochemical device including the above-described separator. According to an eleventh embodiment, there is provided an electrochemical device which is a lithium-sulfur battery including a positive electrode, a negative electrode and a separator interposed between the positive electrode and the negative electrode, wherein the positive electrode includes a sulfide compound as an electrode active material, the separator is the same as defined in any one of the first to the tenth embodiments, and the separator is disposed so that the electrode reactive layer faces the positive electrode.

According to a twelfth embodiment, there is provided the lithium-sulfur battery of the eleventh embodiment, wherein the sulfide compound is a sulfur-carbon composite compound containing sulfur and carbon.

In still another aspect, there is provided a method for preparing the separator as defined in any one of the first to the tenth embodiments. According to a thirteenth embodiment, there is provided a method for preparing a separator, including the steps of: (S1) preparing a non-woven web substrate; and (S2) irradiating laser to the surface of the non-woven web substrate so that the surface portion of the non-woven web substrate may be carbonized through pyrolysis to form an electrolyte-holding layer including an electrode reactive layer and a non-woven web layer.

According to a fourteenth embodiment, there is provided the method for preparing a separator of the thirteenth embodiment, which further includes the steps of: (S3) preparing a porous substrate layer; and (S4) binding the porous substrate layer with the electrolyte-holding layer prepared from step (S2).

Advantageous Effects

The separator according to the present disclosure includes an electrolyte-holding layer derived from a non-woven web, and thus can increase reactivity in an electrode. In addition, the electrolyte-holding layer includes a carbide of organic polymer material, and thus can maximize the reactivity. Further, the lithium-sulfur battery including an electrolyte-holding layer according to the present disclosure shows improved reactivity in an electrode, and thus provides improved life characteristics.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or ratios of elements in the accompanying drawings may be exaggerated for the purpose of clearer description.

BEST MODE

Figure 1:
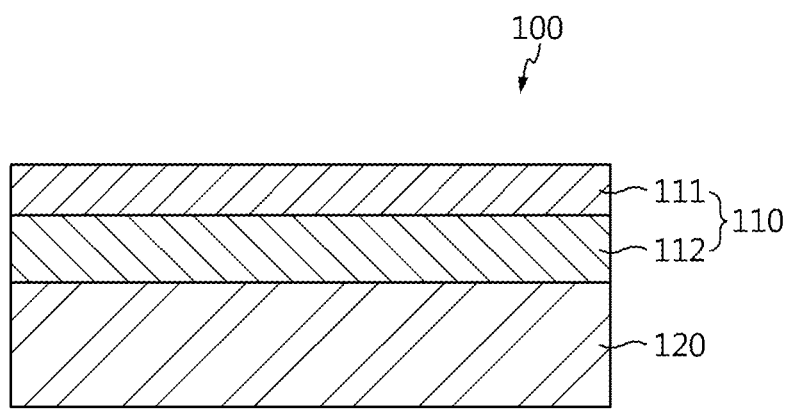
FIG. 1 shows the separator according to an embodiment of the present disclosure.

Hereinafter, a preferred embodiment of the present disclosure will be described in detail. In addition, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

As used herein, the expression 'one portion is linked to another portion' includes not only 'one portion is linked directly to another portion' but also 'one portion is linked electrically to another portion with the other portion interposed between them'.

It will be understood that the terms "comprises" and/or "comprising", or "includes" and/or "including" when used in this specification, refer to the presence of any stated element, but do not preclude the addition of one or more other elements.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

In one aspect, there is provided a separator for an electrochemical device and an electrochemical device including the separator. In another aspect, there is provided a method for preparing the separator. The separator according to the present disclosure includes an electrode reactive layer, which accelerates reaction in an electrode, on the outermost surface of the separator which faces a positive electrode, and thus provides a battery with improved life characteristics when it is applied to a battery.

According to the present disclosure, the electrochemical device includes any devices carrying out electrochemical reactions and particular examples thereof include all kinds of primary batteries, secondary batteries, fuel cells, solar cells or capacitors, such as super-capacitor devices. Particularly, the secondary batteries preferably include lithium secondary batteries, such as lithium metal secondary batteries, lithium ion secondary batteries, lithium polymer secondary batteries, lithium ion polymer secondary batteries, or the like. In addition, according to an embodiment of the present disclosure, the electrochemical device preferably includes a lithium-sulfur battery or lithium-sulfur lithium ion secondary battery including a sulfide compound as a positive electrode active material.

FIG. 1 shows the sectional structure of the separator according to an embodiment of the present disclosure. Referring to FIG. 1, the separator 100 according to the present disclosure includes an electrolyte-holding layer 110, which includes an electrode reactive layer 111 as a product formed by carbonization of an organic polymer material through pyrolysis or the like, and a non-woven web layer 112. According to an embodiment of the present disclosure, the electrolyte-holding layer has a porosity of about 40%-70%.

According to an embodiment of the present disclosure, the organic polymer material is a non-woven web substrate including a polymer resin. The electrolyte-holding layer may include an electrode reactive layer formed integrally with the non-woven web layer by the carbonization of the surface portion of the non-woven web substrate through pyrolysis. In other words, the surface portion of the non-woven web substrate is carbonized to form the electrode reactive layer and the remaining non-carbonized portion forms the non-woven web layer. Meanwhile, as used herein, the term 'surface portion' refers to a portion having a predetermined thickness ranging from the surface to a predetermined depth. When forming the electrode reactive layer by carbonization of the non-woven web surface portion according to an embodiment of the present disclosure, the electrode reactive layer may have a thickness corresponding to about $1/10$-$1/2$ of the thickness of the non-woven web substrate, or a thickness of 100 nm-10 μm, or 100 nm-5 μm. However, the thickness of the electrode reactive layer is not limited to the above-defined range and may be controlled adequately depending on the final purpose of use of the separator. In addition, the thickness of the electrode reactive layer may be controlled to a desired thickness by adjusting the structure of the non-woven web, pore distribution, carbonization process and carbonization processing conditions (e.g. processing conditions during layer irradiation). Meanwhile, the boundary surface between the electrode reactive layer and the non-woven web layer may not be defined clearly as a horizontal sectional surface to the plane of the separator. For example, this is because the depth of carbonization caused by laser irradiation may vary with the structural factors of the non-woven web, such as pores thereof.

In addition, when the electrode reactive layer is formed integrally with the non-woven web layer as mentioned above, the non-woven web layer is retained at the bottom of the electrode reactive layer, and thus it is possible to obtain excellent processability when the electrode-holding layer is processed or is laminated with a porous substrate.

According to an embodiment of the present disclosure, the electrolyte-holding layer may be obtained by providing an electrode reactive layer prepared by carbonization of a non-woven web substrate and a non-woven web layer, separately, and laminating them with each other. In addition, the separator according to the present disclosure may not be provided with any non-woven web layer but an electrode reactive layer obtained by carbonizing a non-woven web totally may be disposed directly on the surface of a porous substrate layer.

In addition, according to an embodiment of the present disclosure, the separator may further include a porous substrate layer 120. The porous substrate layer has a plurality of pores formed inside and outside of the body and thus has a porous structure. The separator 100 including such a porous substrate layer 120 is disposed so that the non-woven web layer 112 of the electrolyte-holding layer may be in surface contact with at least one side of the porous substrate layer 120. The electrode reactive layer 111 is disposed on the surface of the electrolyte-holding layer 110. In other words, the separator according to the present disclosure includes the electrode reactive layer 111 disposed on the outermost surface thereof.

According to an embodiment of the present disclosure, the porous substrate may be bound with the electrolyte-holding layer by a conventional adhesion method. For example, an adhesive ingredient, such as a binder resin, is applied to at least a part of the surface of the porous-substrate layer so that the electrolyte-holding layer may be bound with the porous substrate layer by means of the adhesive ingredient. There is no particular limitation in the adhesive and non-limiting examples of the adhesive include a PVdF-based adhesive resin and/or acrylic adhesive resin. Otherwise, any suitable ingredient selected from the adhesive binder resins used for an electrode active material layer may be used.

According to an embodiment of the present disclosure, the non-woven web layer and the non-woven web substrate include a non-woven web. Such a non-woven web has a web-like shape formed by binding fiber assemblies with each other by a chemical action (e.g. combination of an adhesive with fibers), mechanical action or adequate water and heat treatment without any process based on spinning, weaving or knitting. The non-woven web is not particularly limited, as long as it is used conventionally in the art as a separator material.

According to an embodiment of the present disclosure, the non-woven web used as a material for the non-woven web layer and non-woven web substrate may include a highly heat resistant engineering plastic resin. Particularly, the non-woven web substrate used for forming the electrode reactive layer by carbonization through pyrolysis includes a highly heat resistant engineering plastic resin. The highly heat resistant engineering plastic resin has a melting point of 150° C. or hither, preferably 200° C. or hither. As described hereinafter, the electrode reactive layer may be formed by carbonizing the non-woven web through heat treatment, such as laser irradiation. When the electrode reactive layer is formed integrally with the non-woven web layer, heat treatment may be applied merely to the surface portion of the non-woven web substrate. It is preferred to use a highly heat resistant engineering plastic polymer resin having a high melting point as a material for non-woven web so that the non-woven web may retain its porous structural properties even when it is carbonized through heat treatment at high temperature.

The highly heat resistant engineering plastic resin has a number average molecular weight (Mn) of 10,000 or more, preferably 100,000-10,000,000, and more preferably 500,000 or more. Particular examples of the highly heat resistant engineering plastic resin include a polysulfone polymer resin (PSF), polyethersulfone polymer resin (PES), polyetherimide polymer resin (PEI), polyphenylene sulfide polymer resin (PPS), polyetheretherketone polymer resin (PEEK), polyarylate polymer resin (PA), polyamideimide polymer resin (PAI), polyimide polymer resin (PI), polyamide polymer resin, or the like. Particular examples of the polyamide polymer resin include an aramide resin, Nomex, Kevlar, or the like. The plastic engineering resin is not particularly limited to the above-described polymer resins. Any highly heat resistant engineering plastic resin may be used, as long as they can provide the above-mentioned properties. According to an embodiment of the present disclosure, the non-woven web substrate and/or non-woven web layer may include any one of the resins or a combination of two or more of the resins.

According to a preferred embodiment of the present disclosure, the highly heat resistant plastic engineering resin may be a polyamideimide resin, polyimide resin and/or a polyamide resin. Preferably, the polyamideimide resin or polyimide resin is a polymer including imide-containing monomers or a copolymer of an imide-containing monomer with the other monomers. In other words, the polyamideimide resin or polyimide resin includes a linear or aromatic imide group at the backbone thereof.

According to an embodiment of the present disclosure, the porous substrate layer 120 may include a porous polymer film and/or non-woven web. For example, the substrate layer may be a single layer including one type of polymer film or non-woven web. Otherwise, the porous substrate layer may have a stacked structure including two or more of the same or different films or non-woven webs. Preferably, the porous substrate layer may include a porous polymer resin film, and may have a single layer or a stacked structure of the same or different films. The porous polymer film is obtained by melting a polymer resin and molding it to a film shape and may be prepared by a wet process or dry process. According to the present disclosure, any porous substrate layer may be used, as long as it is used as a substrate for a separator. In addition, the porous substrate layer may include a polyolefin polymer resin as its ingredient. Particular examples of the polyolefin polymer resin include, but are not limited to: polyethylene resins or homopropylene (propylene homopolymer), such as a polymer resin selected from low-density polyethylene (LDPE), linear low-density polyethylene (LLDPE), high-density polyethylene (HDPE), ultrahigh-molecular weight polyethylene (UHMWPE), polypropylene, polybutene, polymethyl pentene and copolymers thereof, or a combination thereof, a random copolymer, graft copolymer or block copolymer of propylene with a C4-C12 alpha-olefin, such as ethylene, 1-butene, 1-pentene, 1-hexene, 1-heptene, 1-octene, 1-nonene, 1-undecene or 1-dodecene, or a polypropylene resin such as propylene copolymer, or a combination thereof.

According to an embodiment, the electrode reactive layer 111 is formed by carrying out heat treatment at high temperature so that a part of the non-woven web surface may be carbonized through pyrolysis, and may include graphitic carbon formed by carbonization of a carbonaceous polymer resin.

According to an embodiment, the heat treatment may be carried out by laser irradiation.

According to an embodiment, the laser irradiation processing condition is not particularly limited, as long as it allows formation of a desired electrode reactive layer. According to an embodiment, the frequency in the laser irradiation may be controlled adequately within a range of 10 kHz-100 kHz. In addition, the scan rate may be controlled adequately within a range of 1000-5000 mm/s, and the hatching may be controlled adequately within a range of 0.01 mm-1 mm. In addition, the laser duty (%) may be controlled adequately within a range of about 5%-20% or 8%-15%. When the laser duty is less than 5%, it is not possible to carry out carbonization sufficiently, and thus it is not possible to accomplish a desired electrode reaction. On the contrary, when the laser duty is larger than 20%, the film may have decreased mechanical strength undesirably.

According to an embodiment, the electrode reactive layer has a thickness of 1 μm-100 μm, 3 μm-20 μm, or 3 μm-10 μm.

The separator 100 having the above-described properties includes an electrolyte-holding layer 110 having high porosity so that the electrolyte may be distributed and retained sufficiently between an electrode and the separator, thereby providing an effect of increasing ion conductivity. In addition, the electrode reactive layer 111 which is the surface formed by carbonization of the non-woven web substrate accelerates reaction in an electrode, thereby providing improved life characteristics.

In another aspect, there is provided an electrochemical device including a positive electrode, a negative electrode, a separator interposed between the positive electrode and the negative electrode, and an electrolyte. According to the present disclosure, the separator is a separator 100 having the above-described characteristics according to the present disclosure. The electrochemical device is a lithium ion secondary battery, preferably a lithium-sulfur battery including a sulfide compound as a positive electrode active material.

The positive electrode may be obtained by applying a mixture of a positive electrode active material, a conductive material and a binder to a positive electrode current collector, followed by drying. If necessary, the mixture may further include a filler.

According to an embodiment of the present disclosure, the positive electrode includes a sulfide compound as a positive electrode active material.

The sulfide compound is not particularly limited, as long as it can be used as a positive electrode active material for a lithium-sulfur battery. Particularly, the sulfide compound may be a sulfur-carbon composite compound containing sulfur and carbon. Otherwise, the sulfide compound may be S-PAN compound obtained from reaction of polyacrylonitrile with sulfur.

In addition to the sulfide-based positive electrode active material, the positive electrode may further include, as an active material, at least one selected from the group consisting of: a layered compound such as lithium cobalt oxide (LiCoO$_2$) or lithium nickel oxide (LiNiO$_2$), or a compound substituted with one or more transition metals; a lithium manganese oxide represented by the chemical formula of Li$_{1+x}$Mn$_{2-x}$O$_4$ (wherein x is 0-0.33), LiMnO$_3$, LiMn$_2$O$_3$ or LiMnO$_2$; a lithium copper oxide (Li$_2$CuO$_2$); a vanadium oxide such as LiV$_3$O$_8$, LiFe$_3$O$_4$, V$_2$O$_5$ or Cu$_2$V$_2$O$_7$; a Ni-site type lithium nickel oxide represented by the chemical formula of LiNi$_{1-x}$M$_x$O$_2$ (wherein M is Co, Mn, Al, Cu, Fe, Mg, B or Ga, and x is 0.01-0.3); a lithium manganese composite oxide represented by the chemical formula of LiMn$_{2-x}$M$_x$O$_2$ (wherein M=Co, Ni, Fe, Cr, Zn or Ta, and x is 0.01-0.1) or Li$_2$Mn$_3$MO$_8$ (wherein M=Fe, Co, Ni, Cu or Zn); LiMn$_2$O$_4$ in which Li is partially substituted with an alkaline earth metal ion; a disulfide compound; Fe$_2$(MoO$_4$)$_3$ or the like. According to an embodiment of the present disclosure, the electrode reactive layer of the separator may be disposed so that it may face the positive electrode in the electrochemical device.

Figure 2:
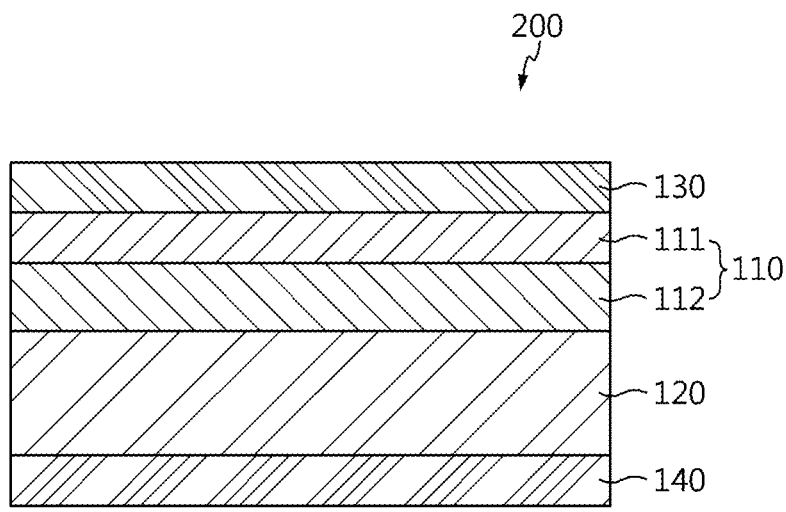
FIG. 2 shows the lithium-sulfur battery according to an embodiment of the present disclosure.

FIG. 2 shows the sectional surface of the lithium-sulfur battery 200 according to an embodiment of the present disclosure. Referring to FIG. 2, the separator 100 is disposed in such a manner that it allows electrical insulation between a positive electrode 130 and a negative electrode 140 between both electrodes. Particularly, the separator 100 is disposed so that the electrode reactive layer 111 faces the positive electrode 130.

The separator according to the present disclosure includes a porous electrode reactive layer and a non-woven web layer, wherein the electrode reactive layer retains a shape of non-woven web and had a high porosity of about 40-80%. Therefore, the separator functions as an electrolyte-holding layer. Thus, when sulfur (e.g. sulfur, carbon-sulfur composite or S-PAN material, or the like) is contained in the positive electrode, it is possible to alleviate an increase in electrolyte concentration caused by polysulfide dissolved from the positive electrode, and thus to contribute to reduction of resistance. Therefore, such a non-woven web separator can improve the initial discharging capacity and can reduce over-voltage in a lithium-sulfur battery including sulfur as a positive electrode active material. In addition to the above, the carbonized layer formed by laser irradiation to the surface of the separator, i.e., the electrode reactive layer according to the present disclosure has electro-conductivity, and thus improves reactivity of sulfur dissolved from the positive electrode and assists an increase in capacity. Further, it is possible to reduce irreversible capacity, thereby providing a low decrease in discharging capacity during the initial cycle.

The positive electrode current collector generally has a thickness of 3-500 μm. The positive electrode current collector is not particularly limited, as long as it has high conductivity while not causing any chemical change in the corresponding battery. Particular examples of the positive electrode current collector include stainless steel, aluminum, nickel, titanium, baked carbon, or aluminum or stainless steel surface treated with carbon, nickel, titanium, silver, etc., or the like.

The negative electrode may be obtained by applying a mixture of a negative electrode active material, a conductive material and a binder to a negative electrode current collector, followed by drying. If necessary, the mixture may further include a filler.

Particular examples of the negative electrode active material include lithium metal and lithium alloys (e.g. alloys of lithium with at least one metal selected from aluminum, zinc, bismuth, cadmium, silicon, lead, tin, gallium and indium).

The negative electrode current collector may include any metal having high conductivity, as long as the metal allows easy adhesion of a negative electrode mixture and has no reactivity in a voltage range of the corresponding electrochemical device. The current collector is not particularly limited, and particular examples thereof include stainless steel, aluminum, nickel, titanium, baked carbon, or aluminum or stainless steel surface treated with carbon, nickel, titanium, silver, etc., or the like.

According to the present disclosure, the binder for an electrode is an ingredient which assists binding between an active material with a conductive material or the like, and binding to a current collector. Particular examples of the binder include polyvinylidene fluoride, polyvinyl alcohol, carboxymethyl cellulose (CMC), starch, hydroxypropyl cellulose, regenerated cellulose, polyvinyl pyrrolidone, tetrafluroethylene, polyethylene, polypropylene, ethylene-propylene-diene terpolymer (EPDM), sulfonated EPDM, styrene butyrene rubber, fluororubber, various copolymers, or the like.

In addition, the conductive material may be any one used conventionally for manufacturing an electrode. Non-limiting examples of the conductive material include any one selected from carbon nanotubes, acetylene black, carbon black, natural graphite, artificial graphite, ketjen black and carbon black, or a combination of two or more of them.

In addition, the electrolyte includes an organic solvent and a predetermined amount of lithium salt. Particular examples of the organic solvent include at least one selected from propylene carbonate (PC), ethylene carbonate (EC), butylene carbonate (BC), diethyl carbonate (DEC), dimethyl carbonate (DMC), dipropyl carbonate (DPC), methyl propionate (MP), dimethyl sulfoxide, acetonitrile, dimethoxyethane, diethoxyethane, tetrahydrofuran, N-methyl-2-pyrrolidone (NMP), ethyl methyl carbonate (EMC), γ-butryolactone (GBL), fluoroethylene carbonate, methyl formate, ethyl formate, propyl formate, methyl acetate, ethyl acetate, propyl acetate, pentyl acetate, methyl propionate, ethyl propionate, propyl propionate, butyl propionate, or a combination thereof, halogen derives of the organic solvents, linear esters, linear ethers and cyclic esters.

Non-limiting examples of the linear ether include at least one selected from the group consisting of dimethyl ether, diethyl ether, dipropyl ether, dibutyl ether, diisobutyl ether, ethylmethyl ether, ethylpropyl ether, ethyl tert-butyl ether, dimethoxymethane, trimethoxymethane, dimethoxyethane, diethoxyethane, dimethoxypropane, diethylene glycol dimethyl ether, diethylene glycol diethyl ether, triethylene glycol dimethyl ether, tetraethylene glycol dimethyl ether, ethylene glycol divinyl ether, diethylene glycol divinyl ether, triethylene glycol divinyl ether, dipropylene glycol dimethylene ether, butylene glycol ether, diethylene glycol ethylmethyl ether, diethylene glycol isopropyl methyl ether, diethylene glycol butyl methyl ether, diethylene glycol tert-butyl ethyl ether and ethylene glycol ethyl methyl ether. In addition, non-limiting examples of the cyclic ether include at least one selected from the group consisting of dioxolane, methyl dioxolane, dimethyl dioxolane, vinyl dioxolane, methoxy dioxolane, ethylmethyl dioxolane, oxane, dioxane, trioxane, tetrahydrofuran, methyltetrahydrofuran, dimethyltetrahydrofuran, dimethoxy tetrahydrofuran, ethoxytetrahydrofuran, dihydropyrane, tetrahydropyrane, furane, and methylfurane.

The lithium salt is a material that can be dissolved easily in the non-aqueous electrolyte. Particular examples of the lithium salt include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, lithium chloroborate, lower aliphatic lithium carboxylate, lithium tetraphenylborate, imide, or the like.

The secondary battery according to the present disclosure may be obtained by introducing an electrode assembly including the positive electrode and the negative electrode stacked alternately with the separator interposed therebetween to a casing material, such as a battery casing, together with the electrolyte, followed by sealing. Any conventional method for manufacturing a secondary battery may be used with no particular limitation.

In addition, elements other than the above-described battery elements may be used, as long as they are used conventionally in the field of batteries, particularly in the field of lithium secondary batteries.

Hereinafter, the present disclosure will be explained in more detail with reference to particular embodiments.

EXAMPLE

One surface of a non-woven web (polyimide, porosity 70%, thickness 25 μm) was irradiated with laser to form an electrode reactive layer. The laser irradiation processing conditions were controlled as follows:

Frequency: 20 kHz, Scan rate: 2,000 mm/s, Hatching 0.1 mm, laser duty (%): 12%

The non-woven web is laminated with a porous film (thickness 20 μm, porosity 45%) made of polyethylene to obtain a separator. The lamination was carried out so that the electrode reactive layer might be exposed to the outer surface.

Next, the separator was interposed between the negative electrode and the positive electrode to obtain an electrode assembly. The positive electrode used herein was a sulfur-carbon composite and the negative electrode used herein was lithium foil (thickness 40 μm). Herein, lamination was carried out so that the electrode reactive layer might face the positive electrode.

The electrode assembly was introduced to a metallic can and an electrolyte including an organic solvent (1,3-dioxolane:dimethoxyethane=1:1 volume ratio) containing 1M of LiTFSI and 1 wt % of $LiNO_3$ was used to obtain a coin cell. The sectional structure of the separator and that of the electrode assembly according to Example are shown in FIG. 1 and FIG. 2, respectively.

Comparative Example 1

Figure 3A:
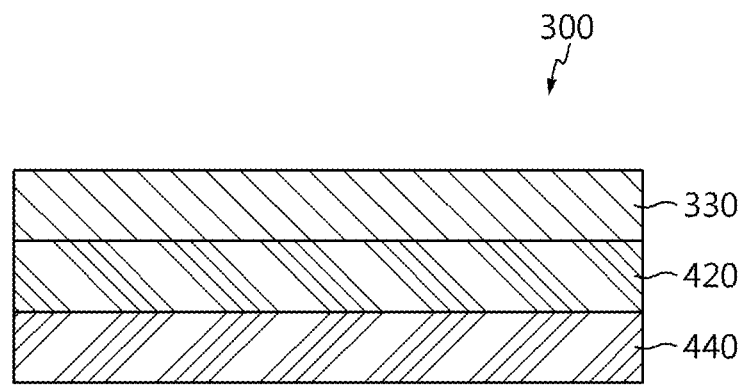
FIG. 3a shows the sectional surface of the electrode assembly according to Comparative Example 1 and FIG. 3b shows the sectional surface of the electrode assembly according to Comparative Example 2.

A porous film (thickness 20 μm, porosity 40%) made of polyethylene was interposed between a negative electrode and a positive electrode to obtain an electrode assembly. The positive electrode used herein was a sulfur-carbon composite and the negative electrode used herein was lithium foil (thickness 40 μm). The electrode assembly was introduced to a metallic can and an electrolyte including an organic solvent (1,3-dioxolane:dimethoxyethane=1:1 volume ratio) containing 1M of LiTFSI and 1 wt % of $LiNO_3$ was used to obtain a coin cell. The sectional structure of the electrode assembly according to Comparative Example 1 is shown in FIG. 3a.

Comparative Example 2

Figure 3B:
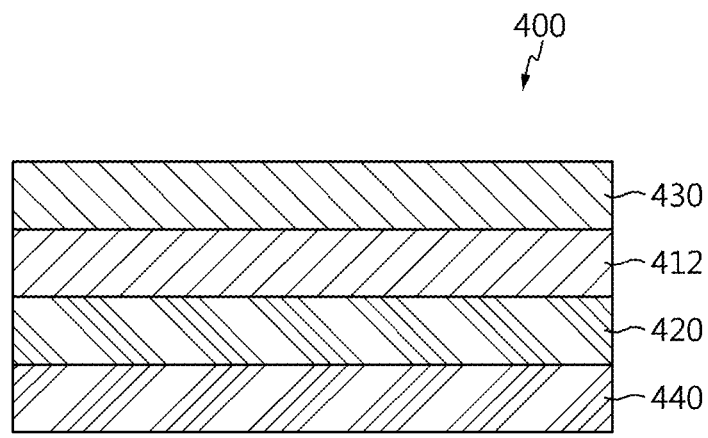

A non-woven web (polyimide, porosity 70%, thickness 25 μm) was laminated with a porous film (thickness 20 μm, porosity 40%) made of polyethylene to obtain a separator. Next, the separator was interposed between a negative electrode and a positive electrode to obtain an electrode assembly. The positive electrode used herein was a sulfur-carbon composite and the negative electrode used herein was lithium foil (thickness 40 μm). Herein, lamination was carried out so that the non-woven web might face the positive electrode. The electrode assembly was introduced to a metallic can and an electrolyte including an organic solvent (1,3-dioxolane:dimethoxyethane=1:1 volume ratio) containing 1M of LiTFSI and 1 wt % of $LiNO_3$ was used to obtain a coin cell. The sectional structure of the electrode assembly according to Comparative Example 2 is shown in FIG. 3b.

Surface Observation

Figure 4:
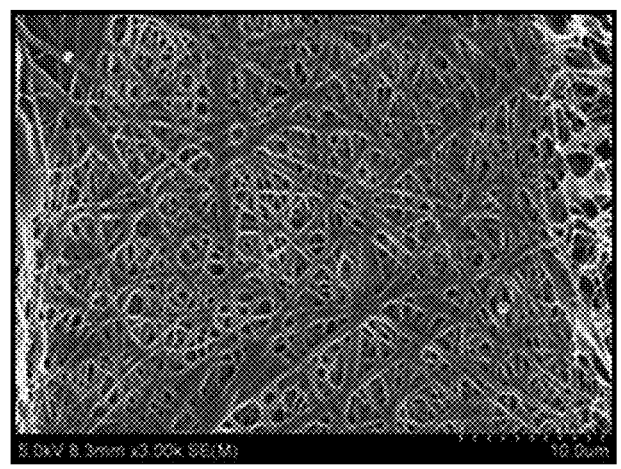
FIG. 4 is a scanning electron microscopic (SEM) image of the non-woven web surface as the surface of the separator according to Comparative Example 2.
Figure 5:
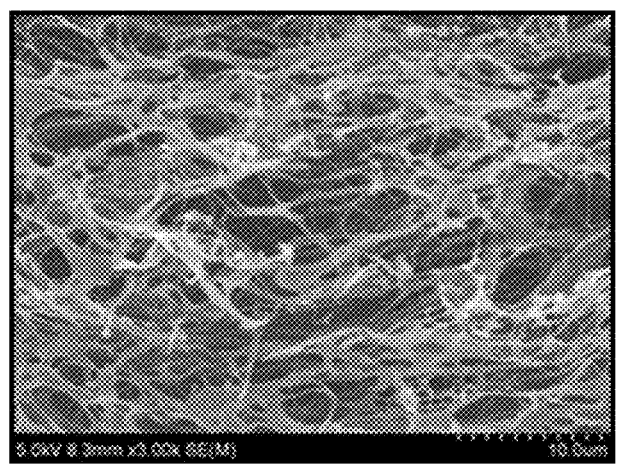
FIG. 5 is a SEM image illustrating the surface of the electrode reactive layer according to Example.

FIG. 4 is a scanning electron microscopic (SEM) image illustrating the surface of the non-woven web according to Comparative Example 2, and FIG. 5 is a SEM image illustrating the surface of the electrode reactive layer according to Example. It can be seen that the non-woven web surface was carbonized by laser irradiation to show a change in surface structure.

Figure 6:
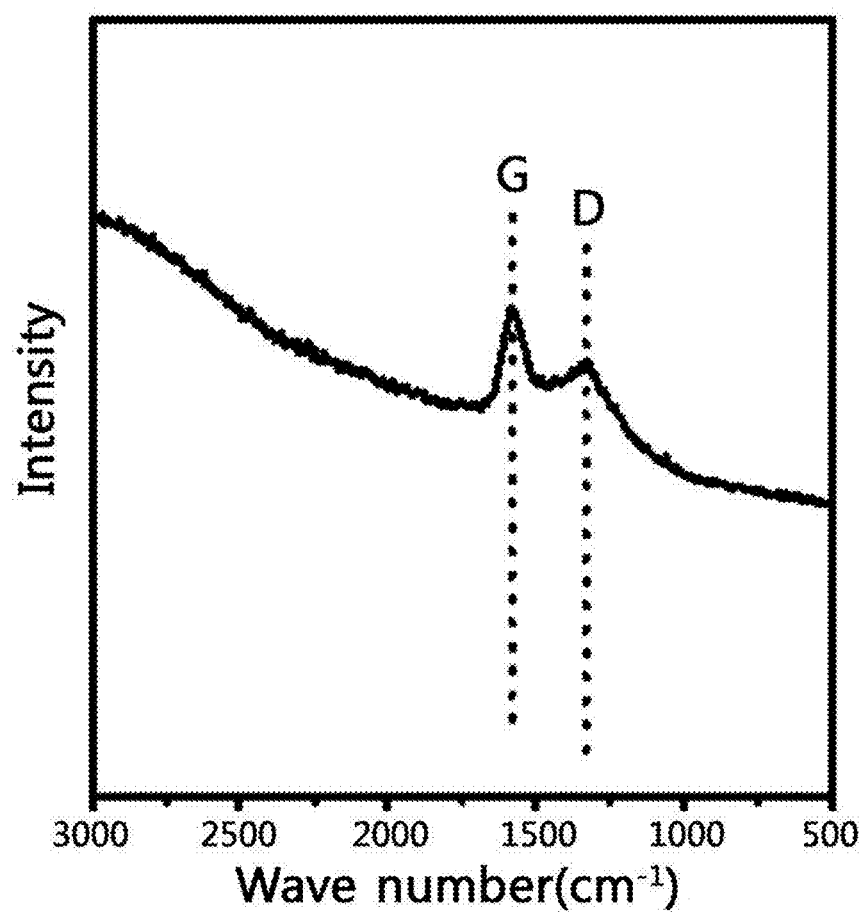
FIG. 6 shows the results of Raman spectrometry of the surface of the electrode reactive layer according to Example.

FIG. 6 shows the results of Raman spectrometry for the electrode reactive layer according to Example. It can be seen from the G and D bands detected at around 1500 $cm^{-1}$ that the non-woven web surface is carbonized to form an electrode reactive layer.

Determination of Surface Resistance

Each of the separators according to Example and Comparative Example 2 was determined for surface resistance by using a 4-point probe measurement system. Surface resistance was measured for the same surface five times in total and the maximum and minimum values were recorded. The results are shown in the following Table 1.

TABLE 1

| | Surface resistance (Ohm/Å) |
|---|---|
| Comparative Example 2 | — |
| Example | Maximum: $4 \times 10^4$ |
| | Minimum: $5 \times 10^3$ |

As can be seen from Table 1, the separator according to Example has electro-conductivity through the carbonization of the surface thereof. On the contrary, the non-woven web separator according to Comparative Example 2 shows no electro-conductivity.

Evaluation of Cycle Characteristics

Each of the batteries according to Example, Comparative Example 1 and Comparative Example 2 was used to evaluate cycle characteristics. Each battery was subjected to three charge/discharge cycles under a constant current (CC) mode at 0.1C under 1.75V-2.5V. Then, each battery was subjected to charge/discharge cycles at 0.2C up to the $35^{th}$ cycle.

Figure 7:
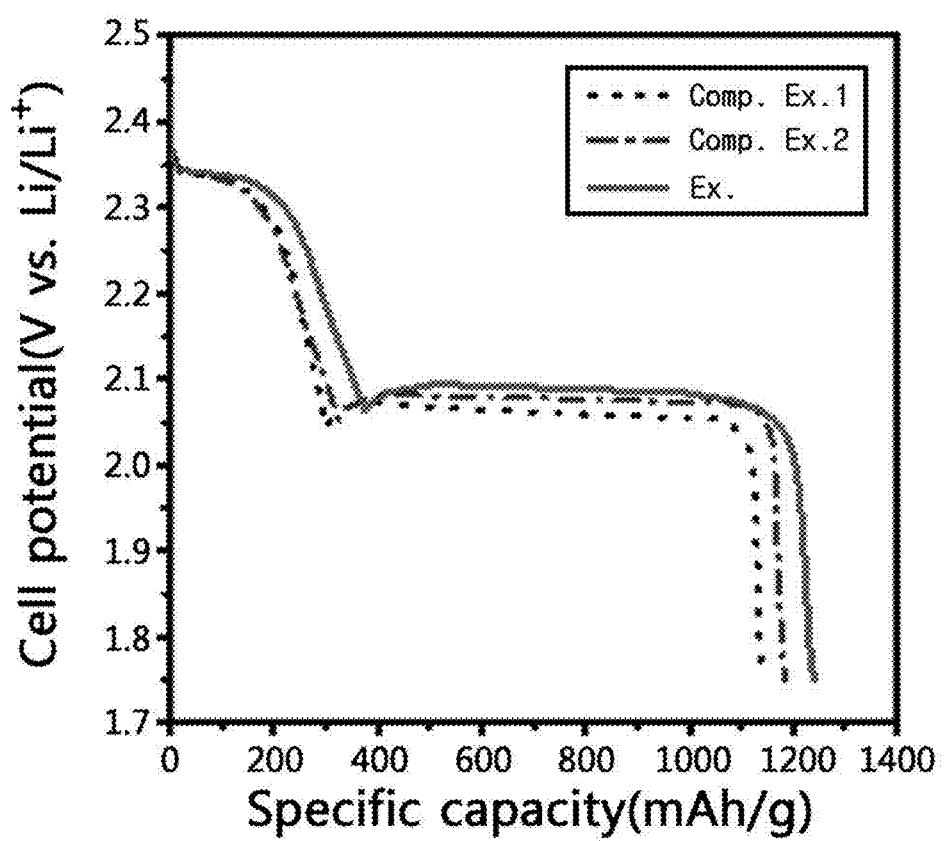
FIG. 7 is a graph illustrating the discharging capacity and over-voltage of each of Example, Comparative Example 1 and Comparative Example 2.

FIG. 7 shows the results of determination of over-voltage of each battery. It can be seen that the battery according to Example shows increased discharging capacity and decreased over-voltage as compared to the discharging capacity of the batteries according to Comparative Examples 1 and 2.

Figure 8:
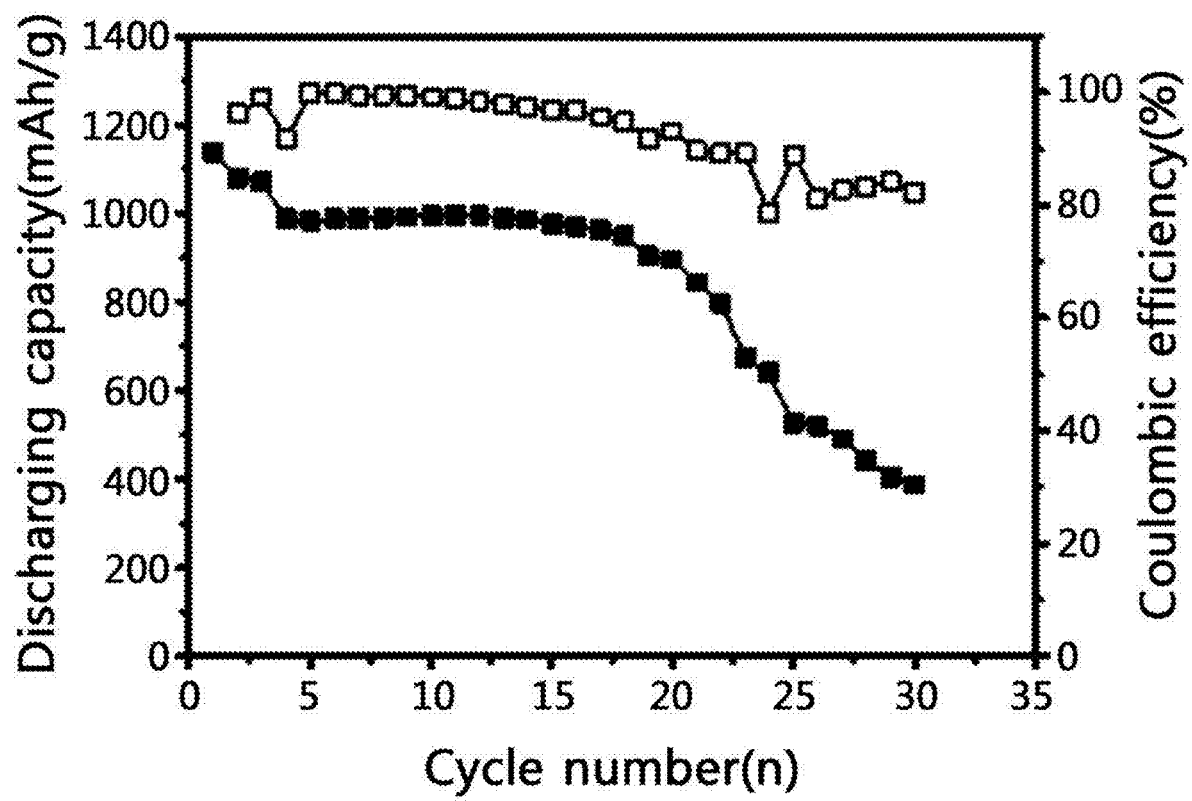
FIG. 8 is a graph illustrating discharging capacity and Coulombic efficiency of Comparative Example 1 as a function of charge/discharge cycles.
Figure 9:
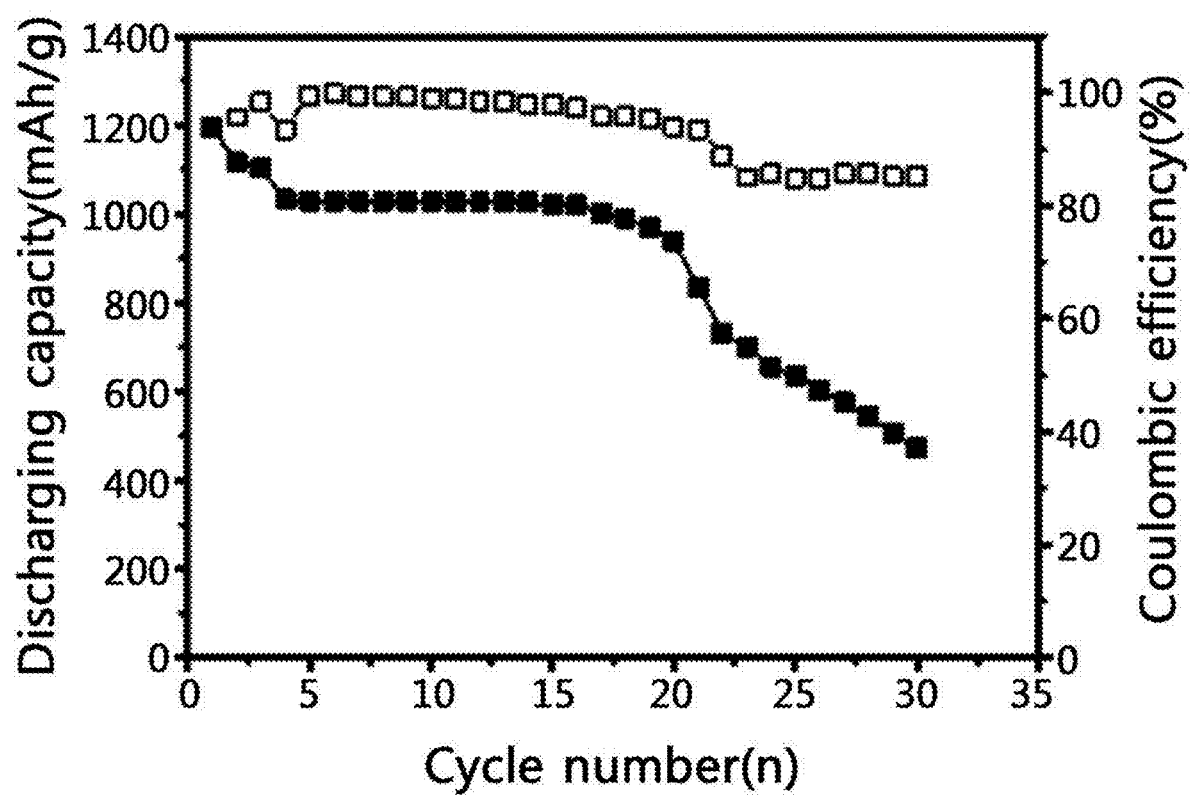
FIG. 9 is a graph illustrating discharging capacity and Coulombic efficiency of Comparative Example 2 as a function of charge/discharge cycles.
Figure 10:
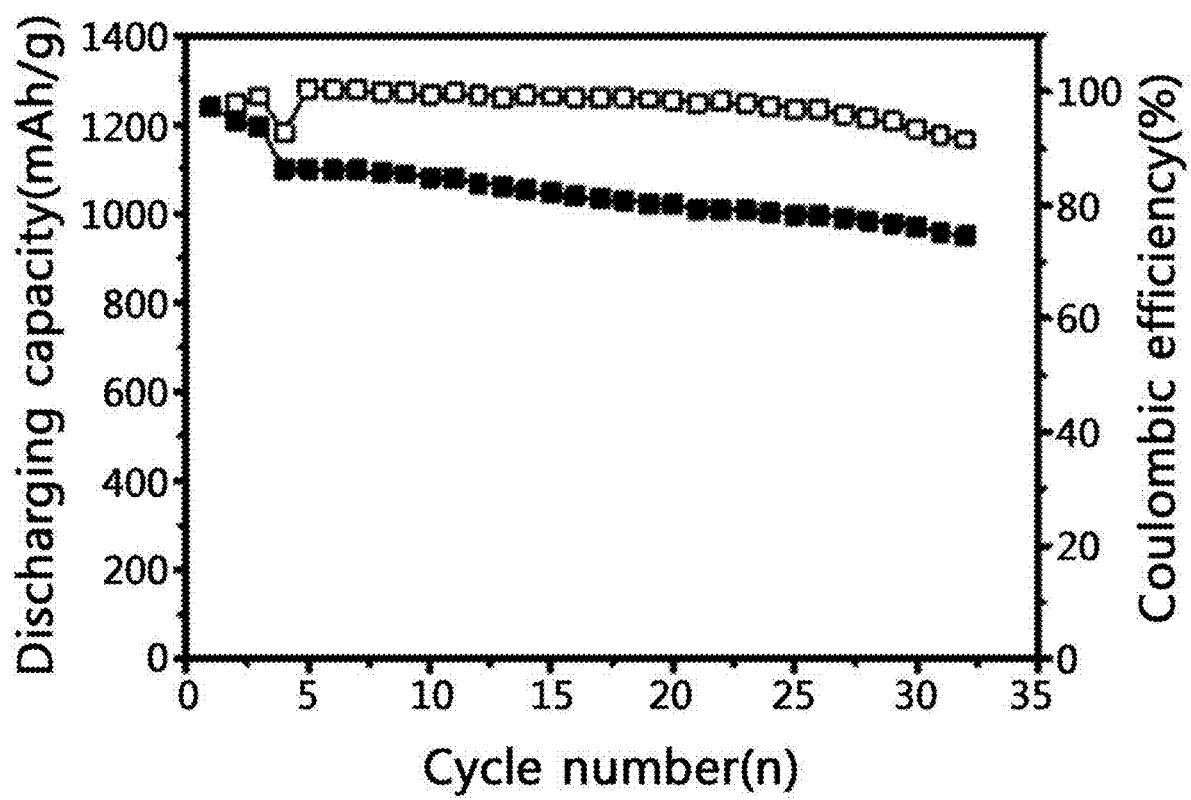
FIG. 10 is a graph illustrating discharging capacity and Coulombic efficiency of Example as a function of charge/discharge cycles.

Meanwhile, FIG. 8 to FIG. 10 illustrate the results of discharging capacity and Coulombic efficiency of each of the batteries according to Example and Comparative Examples 1 and 2 as a function of cycle number. The battery according to Example provided improved life characteristics. Referring to the irreversible capacity within the initial three charge/discharge cycles, the battery according to Example shows a decrease in irreversible capacity as compared to the batteries according to Comparative Examples 1 and 2.

The present disclosure has been described in detail with reference to specific embodiments and drawings. However, it should be understood that the present disclosure is not limited thereto, various changes and modifications within the scope of the disclosure will become apparent to those skilled in the art from this detailed description.

What is claimed is:

1. A separator for an electrochemical device, comprising:
   an electrolyte-holding layer, wherein the electrolyte-holding layer comprises:
   a non-woven web substrate comprising an organic polymer material; and
   an electrode reactive layer disposed on a surface of the non-woven web substrate,
   wherein the electrode reactive layer comprises a carbide of the organic polymer material and a porous structure, and is present at an outermost surface of the separator,
   wherein the electrode reactive layer is formed integrally with the non-woven web substrate by carbonization of a surface portion of the non-woven web substrate, and wherein the surface portion has a thickness ranging from the surface of the non-woven web substrate to a predetermined depth.

2. The separator for an electrochemical device according to claim 1, further comprising:
a porous substrate,
wherein the electrolyte-holding layer is disposed on a surface of the porous substrate,
wherein the porous substrate and the non-woven web substrate are stacked and in surface contact with each other.

3. The separator for an electrochemical device according to claim 1, wherein the electrode reactive layer comprises graphitic carbon as a product generated by the carbonization of the non-woven web substrate, and the organic polymer material comprises a heat resistant plastic engineering polymer resin.

4. The separator for an electrochemical device according to claim 3, wherein the heat resistant plastic engineering polymer resin is at least one selected from the group consisting of polysulfone polymer resin (PSF), polyethersulfone polymer resin (PES), polyetherimide polymer resin (PEI), polyphenylenesulfide polymer resin (PPS), polyetheretherketone polymer resin (PEEK), polyarylate polymer resin (PA), polyamideimide polymer resin (PAI), polyimide polymer resin (PI) and polyamide polymer resin.

5. The separator for an electrochemical device according to claim 1, wherein the electrode reactive layer has a thickness of 100 nm-5 μm.

6. The separator for an electrochemical device according to claim 1, wherein the organic polymer material comprises a heat resistant plastic engineering polymer resin.

7. The separator for an electrochemical device according to claim 6, wherein the heat resistant plastic engineering polymer resin is at least one selected from the group consisting of polysulfone polymer resin (PSF), polyethersulfone polymer resin (PES), polyetherimide polymer resin (PEI), polyphenylenesulfide polymer resin (PPS), polyetheretherketone polymer resin (PEEK), polyarylate polymer resin (PA), polyamideimide polymer resin (PAI), polyimide polymer resin (PI) and polyamide polymer resin.

8. The separator for an electrochemical device according to claim 2, wherein the porous substrate comprises a polyolefin polymer resin.

9. The separator for an electrochemical device according to claim 1, wherein the electrolyte-holding layer has a porosity of 40%-70%.

10. A lithium-sulfur battery, comprising:
a positive electrode having a sulfide compound as an electrode active material;
a negative electrode; and
the separator of claim 1 interposed between the positive electrode and the negative electrode, wherein the electrode reactive layer of the separator faces the positive electrode.

11. The lithium-sulfur battery according to claim 10, wherein the sulfide compound is a sulfur-carbon composite compound containing sulfur and carbon.

12. A method for preparing the separator of claim 1, comprising:
irradiating a surface of a non-woven web substrate to carbonize a surface portion of the non-woven web substrate to form an electrode reactive layer,
wherein the non-woven web substrate comprises an organic polymer material, and wherein the electrode reactive layer and a non-woven web substrate together form an electrolyte-holding layer.

13. The method for preparing the separator for an electrochemical device according to claim 12, further comprising:
binding a porous substrate layer with the electrolyte-holding layer.

* * * * *